United States Patent [19]
Pesch

[11] 3,860,381
[45] Jan. 14, 1975

[54] APPARATUS FOR THE PRODUCTION OF PRESSED BOARD

[75] Inventor: Jürgen Pesch, Krefeld, Germany

[73] Assignee: G. Siempelkamp & Co., Krefeld, Germany

[22] Filed: July 5, 1973

[21] Appl. No.: 376,926

[30] Foreign Application Priority Data
July 4, 1972 Germany............................ 2232720

[52] U.S. Cl.................. 425/338, 425/394, 425/406, 425/455, 100/194, 264/109
[51] Int. Cl............................................. B29c 3/00
[58] Field of Search ........... 425/338, 455, 406, 110, 425/339, 394; 100/258 A, 258 R, 194; 264/109

[56] References Cited
UNITED STATES PATENTS

| | | | |
|---|---|---|---|
| 1,309,128 | 7/1919 | Gammeter...................... | 425/451 X |
| 2,404,165 | 7/1946 | Carver........................... | 425/338 X |
| 3,241,189 | 3/1966 | Siempelkamp.................... | 425/143 |
| 3,517,610 | 6/1970 | Siempelkamp.................... | 425/89 X |
| 3,565,725 | 2/1971 | Siempelkamp..................... | 425/168 |
| 3,810,730 | 5/1974 | Carlsson ........................... | 425/406 |

*Primary Examiner*—Robert L. Spicer, Jr.
*Attorney, Agent, or Firm*—Karl F. Ross; Herbert Dubno

[57] ABSTRACT

A system for the production of pressed board comprises an accelerating belt downstream of a mat-forming conveyor for depositing successive mats upon two stacked conveyors at a speed greater than the speed of the mat-forming conveyor. Once the stacked conveyors are fully charged by successively positioning them at the level of the accelerating conveyor, they simultaneously feed their mats into the openings of two-opening prepress in which the upper and lower platens compress the mats against a substantially stationary intermediate platen. Both compressed mats are then simultaneously fed to two levels of a multi-level charging rack so that, when the latter is fully charged, all of the compressed mats can simultaneously be introduced into a multiplaten press for finish pressing.

9 Claims, 2 Drawing Figures

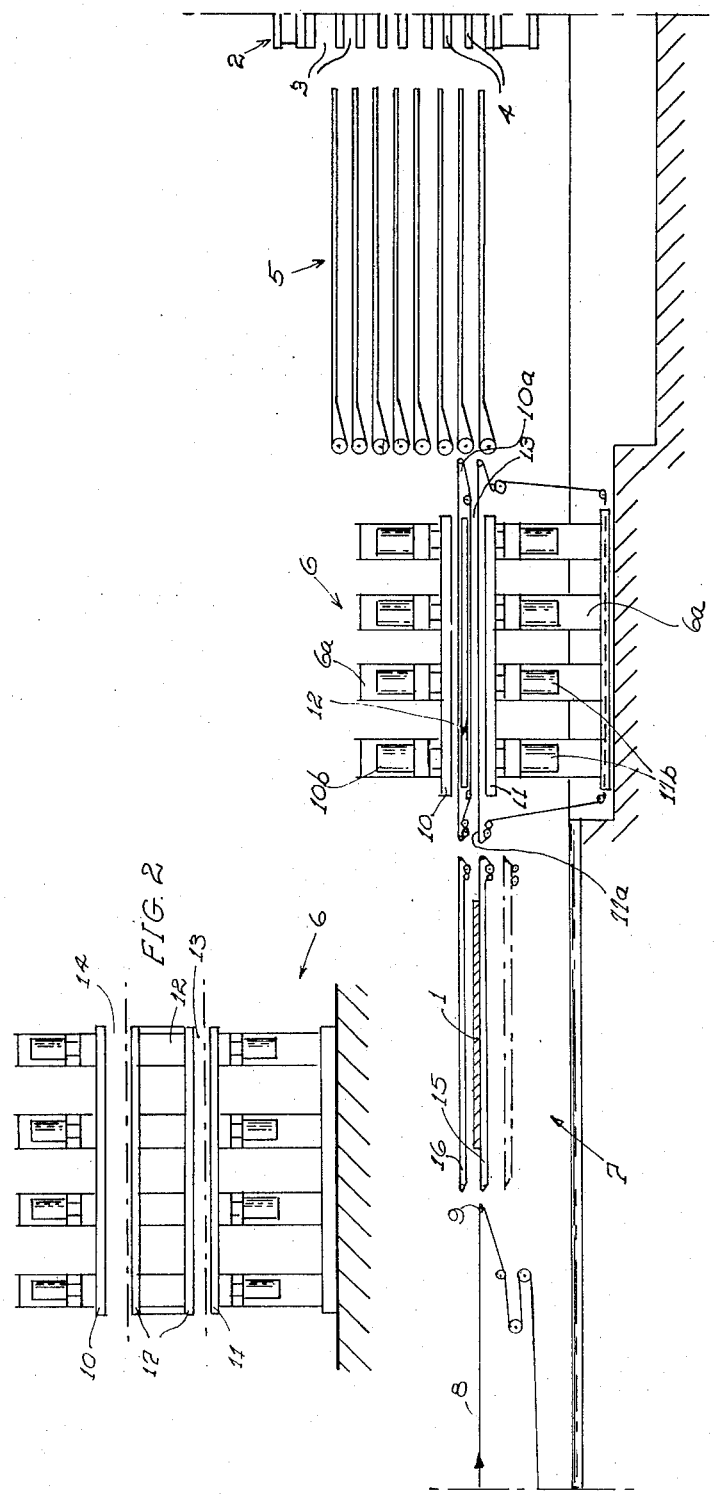

3,860,381

APPARATUS FOR THE PRODUCTION OF PRESSED BOARD

FIELD OF THE INVENTION

The invention relates to a system for the production of pressed board and, more particularly, to an installation for producing pressed board and to a method of operating such an installation.

BACKGROUND OF THE INVENTION

In the manufacture of pressed board, it is common to provide a dispensing station at an upstream portion of a conveyor belt or band to deposit a layer of fibers, chips or dust of wood or some other material, with intrinsic thermally activatable binder or a binder which is added to the composition, to subdivide the layer thus formed into a plurality of loosely coherent or noncoherent mats and to press the latter with heat to the desired density.

In this manner so-called hardboard of high structural strength low fluid permeability and excellent surface characteristics can be made. The term "pressed board" is not used herein solely to identify hardboard, but may also refer to less dense and highly porous boards which may be used as thermal or acoustical insulation, interior finishing or the like. Boards of the latter type are generally made with larger fibers, less binder and lower temperatures and pressures.

In early phases of the production of pressed board, the handling of the loosely coherent or noncoherent mats was a considerable problem and to prevent disturbance of the layer of binder and particles or fibers forming the mat, the latter was placed upon a charging tray and carried to the press thereon. Not only did the use of such trays increase the expense of the operation, but the weight of the trays required greaer dimensions for all of the equipment and the recirculation of the trays posed a major difficulty.

Subsequently, systems were developed for the transfer of the mats with a minimum of distortion by the use of so-called conveyor pallets or tablets, i.e., a conveyor belt of small height which could be displaced at the rate at which the mat was deposited upon the conveyor tablet so that relative movement of the mat and the surface of the transfer belt and relative movement of the mat and the surface of the conveyor tablet was made negligible or zero. In another development, prepresses were provided upstream of the multiplaten press for individually compacting the mats and thereby making them more coherent and improving the quality of the finished board. It is with systems of the latter type that the present invention is concerned.

It will be immediately apparent that the use of a platen press along a path for production of pressed board requires interruption of the feed of the mat for the duration of the prepress cycle. As a result, feed of the precompressed boards to the multiplaten press is impeded and the output of the plant is lower than is desirable.

OBJECTS OF THE INVENTION

It is the principal object of the present invention to provide an apparatus for the production of chipboard, fiberboard and the like (generally described as pressed board) whereby the aforementioned disadvantages are obviated and the output of the installation can be increased by comparison to prior-art systems.

It is another object of the invention to provide an improved method of operating a plant for the production of pressed fiber or particle board.

SUMMARY OF THE INVENTION

These objects and others which will become apparent hereinafter are attained, in accordance with the present invention, in a system or installation for the production of pressed board which comprises a multiplaten finishing press (preferably having two $n$ stages or levels, where $n$ is an integer), a charging rack upstream from this finishing press and having a number of levels equal to that of the multiplaten press, a two-opening prepress disposed upstream of the charging rack and provided with conveyor belts for advancing the precompressed mats out of the prepress and onto the respective tiers of the charging rack, a pair of stacked conveyors upstream of the two-opening prepress and alternately alignable with the discharge end of an accelerating belt for receiving uncompressed mats and alignable with the openings of the prepress for simultaneously feeding the mats on the stacked conveyors into the prepress. Upstream of the accelerating conveyor, there is provided a dispensing station and a mat-forming belt in the manner previously described and the accelerating belt has a transfer nose or flap which deposits the mats onto the conveyors of the stack without distortion.

The invention resides in providing the prepress only as a two-stage press having an upper movable platen, and an intermediate substantially fixed platen toward which the upper and lower platens may be moved simultaneously and in opposite directions. The invention resides also in the combination of this press with a charging device therefor comprising two vertically spaced conveyors in the stack and alignable with the respective openings of the prepress, the stacked conveyors being vertically shiftable for such alignment and being successively positionable at the level of the transfer nose of the accelerating belt which lies at the level at the lower stage of the open two-stage prepress. The vertical displacement of the stacked conveyors thus can be relatively small since it need only amount to the distance between the two openings of the press and hence the device can be operated at high speed. The mat-forming speed can be increased and large multiplaten presses can be used to increase the output of the installation over that of conventional systems. Of course, a storage rack may also be provided between the charging rack and the finishing press or between the prepress and the charging rack.

The invention comprises also a method of operating a plant for the production of pressed board which comprises the steps of:

a. feeding a succession of mats at a predetermined level to a prepress charging station;

b. depositing the mats at this level on a pair of stacked conveyors at the prepress charging station in succession by successively positioning the conveyors at this level;

c. simultaneously advancing both mats for the conveyors of the prepress charging station in respective openings of the two-opening platen prepress;

d. simultaneously advancing both of the movable platens of the latter in opposite directions toward the intermediate platen to compress the mats while repeating step (b) to deposit further mats on the conveyors during the compression of the mats in the prepress;

e. opening the prepress and advancing the compressed mats simultaneously onto respective levels of a press-charging rack having a multiplicity of levels;

f. repeating steps (d) and (e) until the latter rack is fully charged with compressed mats; and g. advancing all of the compressed mats on the rack into respective tiers of a multiplaten press having a number of openings equal to the number of levels of the rack, and finish-pressing the compressed mats in the platen press.

The prepress, according to the invention, may be made with a relatively light intermediate platen since, in the usual press operation, the movable platens will apply equal forces to both sides of the intermediate platen. Where, with a light platen, only a single mat is compressed (e.g., when for some reason the charging rack of the multiplaten press requires only a single additional mat to complete its charge), the movable platen of the prepress associated with the empty level may bear directly against the intermediate platen to support the latter against the force of the operating platen. However, the intermediate platen may be made massive and rigid so that it is self-supporting against a platen applying force thereto nonuniformly from either side. In general, the intermediate platen surface at least should be yieldable and may be constituted by a sheet-metal layer above a body of an elastomer or an array of springs. The upper and lower movable platens of the prepress may be heated and the upper and lower plates of the intermediate platen can likewise be heated. When the plates and platens are heated as described herein, the prepress may be used as a finishing press for some types of pressed boards.

DESCRIPTION OF THE DRAWING

The above and other objects, features and advantages of the present invention will become more readily apparent from the following description, reference being made to the accompanying drawing in which:

FIG. 1 is a vertical diagrammatic cross-section of an installation for the production of pressed board according to the invention; and FIG. 2 is a vertical section, also in diagrammatic form, of a two-stage prepress according to the invention.

SPECIFIC DESCRIPTION

In the drawing I show a plant for the production of pressed board from mats 1 of wood particles, fibers and binder, which installation comprises a multiplaten finishing press of the type described in U.S. Pat. Nos. 3,241,189, 3,209,405 and 3,409,942. Such a press may have platens which are heated as described in U.S. Pat. No. 3,517,610 and is adapted to convert coherent prepressed mats into finished boards which may be tempered or the like in a kiln (see U.S. Pat. No. 3,050,200).

Immediately upstream of the multiplaten finishing press 2, whose openings are represented at 3 and whose platens are designated at 4, there is provided a vertically displaceable charging rack 5 consisting of a number of vertically spaced conveyor pallets respectively alignable with the openings 3 of the multiplaten press.

A vertically shiftable rack of this type has been illustrated diagrammatically in U.S. Pat. No. 3,565,725 and is shown in more detail in U.S. Pat. No. 3,517,610.

Upstream of the rack 5 there is provided a two-opening prepress 6 provided with conveyor belts 10a and 11a for advancing the pressed mat out of the prepress and onto two levels of the charging rack 5 when the latter are aligned with the prepress. The prepress comprises an upper movable platen 10 displaceable by hydraulic cylinder 10b on the press frame 6a, a vertically displaceable lower platen 11, having cylinders 11b mounted on the frame 6a and a light-weight intermediate platen 12 which may be composed of or coated with resiliently compressible material. The intermediate platen 12 is fixed to the frame and the cylinders 10b and 11b are so connected that the upper and lower platens 10, 11 move simultaneously toward the intermediate platen.

Upstream of the prepress 6, there is provided a charging station 7 comprising a pair of vertically displaceable conveyor pallets, the conveyor pallets being of the type illustrated preferably in FIG. 1 of U.S. Pat. 3,565,725. The pallets 15 and 16 are mounted on a vertically displaceable support in accordance with the latter patent and are shiftable, from the solid line position shown, downwardly so that the lower conveyor 15 lies as shown by dot-dash lines and the upper conveyor coincides with the solid line position for the conveyor 15 as now illustrated. In other words, the conveyors 15 and 16 are alternately aligned with the transfer nose 9 of an accelerating conveyor which may be of the type shown in U.S. Pat. No. 3,565,725 downstream of the mat-forming conveyor. In the elevated position of the conveyors 15 and 16 they are aligned with the two levels 13 and 14 of the press 6 and can simultaneously transfer their mats to the prepress.

The accelerating belt 8, cooperates with the mat-forming belt and dispensing station (U.S. Pat. No. 3,565,725).

In the embodiment illustrated, the intermediate fixed platen 12 of the prepress 6 is more or less yieldable and forms a rigid body only when the upper and lower platens are pressed thereagainst via the mats between them. Of course, the intermediate platen 12 can float through although this has not been found to be desirable.

In FIG. 2, I show a system in which the intermediate platen 12 is fixed and rigid and does not require pressure from one side to support the press operation of the other. The platens 10 and 11, as well as the plates 17 of the intermediate platen may be heated, e.g. as described in U.S. Pat. No. 3,241,189.

A succession of mats is fed by the belt 8 to the transfer nose 9 and a mat is deposited upon conveyor 16 in the lower position of the two stacked belts and upon the conveyor 15 when the stack is elevated. As the mat is applied to conveyor 15, the prepress 6 opens and the previously compressed mats are displaced therefrom by the belts 10a and 11a while the mats stored upon the belts 15 and 16 are deposited upon these same conveyors and are advanced into the prepress. The prepress closes while additional mats are deposited upon conveyors 15 and 16. After the mats from the prepress have been deposited on the rack 5, the latter is raised by two levels and awaits the next pair of compressed mats. Meanwhile the finishing press completes its press cycle and, when the finishing press opens, all of the pressed boards are discharged and the charging rack 5 is emptied into the multiplaten press 2.

I claim:

1. An installation for the production of pressed board, comprising:
   a. a multiplaten press having a multiplicity of tiers each adapted to receive a compressed mat for the finish-pressing thereof into a board;
   b. a charging rack adjacent said multiplaten press and having a number of levels corresponding to the number of tiers of said press, said levels each receiving a compressed mat for the simultaneous displacement thereof onto the respective tiers of said multiplaten press;
   c. a two-opening prepress upstream of said rack and comprising:
      $c_1$. a generally stationary intermediate platen,
      $c_2$. an upper platen mounted above said intermediate platen,
      $c_3$. a lower platen mounted below said intermediate platen, and
      $c_4$. means for displacing both said upper and lower platens toward said intermediate platen to compress respective mats against said intermediate platen;
   d. means for simultaneously feeding the compressed mats in said prepress onto respective levels of said charging rack;
   e. a pair of stacked vertically displaceable conveyors upstream of said prepress and respectively alignable with openings thereof for advancing mats simultaneously into both openings of said prepress; and
   f. means for feeding a succession of mats to said stacked conveyors at a predetermined level, said stacked conveyors being successively positionable at said predetermined level for receiving respective mats.

2. The installation defined in claim 1 wherein said means for feeding a succession of mats to said stacked conveyors comprises an accelerating belt having a transfer nose for depositing each mat upon the respective conveyor of the stack at a rate sufficient to charge the stack with mats during the pressing period of said prepress.

3. The installation defined in claim 2 wherein said means for feeding said succession of mats to said stacked conveyors comprises a mat-forming belt upstream of said accelerating belt and a dispenser for depositing a mat-forming mixture on said mat-forming belt, said accelerating belt advancing said mats onto said conveyors at a speed higher than that of the mat-forming belt.

4. The installation defined in claim 1 wherein said means for feeding the compressed mats onto respective levels of said charging rack includes a respective conveyor belt passing through each of said openings of said prepress and receiving mats from the stacked conveyors.

5. The installation defined in claim 4 wherein said intermediate platen comprises a rigid beam adapted to withstand the press pressure of either of the other platens applied alone.

6. The installation defined in claim 4 wherein said intermediate platen is at least presently yieldable and is supported by each of the other platens against the force applied thereby.

7. The installation defined in claim 5 wherein said intermediate platen has upper and lower plates, said plates and said upper and lower platens being provided with means for heating same.

8. The installation defined in claim 4 wherein said platens are heated.

9. The installation defined in claim 8 wherein said charging rack is provided at each of its levels with a conveyor pallet for advancing the respective compressed mats into the multiplaten press.

* * * * *